(12) United States Patent
Yonezawa (10) Patent No.: US 8,306,526 B2
(45) Date of Patent: Nov. 6, 2012

(54) WIRELESS COMMUNICATION AREA MEASURING APPARATUS AND COMPUTER PROGRAM OF THE SAME

(75) Inventor: Kenya Yonezawa, Fujimino (JP)

(73) Assignee: KDDI Corporation, Tokyo (JP)

( * ) Notice: Subject to any disclaimer, the term of this patent is extended or adjusted under 35 U.S.C. 154(b) by 1124 days.

(21) Appl. No.: 12/088,651

(22) Filed: Mar. 28, 2008

(65) Prior Publication Data
US 2009/0122739 A1 May 14, 2009

(30) Foreign Application Priority Data
Mar. 29, 2007 (JP) .................................. 2007-088439

(51) Int. Cl.
*H04W 24/00* (2009.01)
(52) U.S. Cl. ........ 455/423; 370/312; 455/418; 455/419; 455/420; 455/424; 455/507; 455/517; 455/522; 455/524; 455/561; 455/115.1; 455/115.2; 455/115.3; 455/115.4; 340/853.2; 340/915; 340/539.16; 340/539.17; 340/539.2; 340/539.21; 340/425.2
(58) Field of Classification Search .................. 370/312; 455/418–420, 423, 424, 507, 517, 522, 524, 455/561, 115.1–115.4; 340/853.2, 915, 539.16, 340/539.17, 539.2, 539.21, 425.2
See application file for complete search history.

(56) References Cited

U.S. PATENT DOCUMENTS

| 2002/0081977 | A1* | 6/2002 | McCune, Jr. ................. 455/67.1 |
| 2006/0072501 | A1* | 4/2006 | Toshimitsu et al. ........... 370/328 |
| 2006/0194586 | A1* | 8/2006 | Tran .............................. 455/453 |
| 2008/0232300 | A1* | 9/2008 | McCoy et al. ................ 370/328 |

FOREIGN PATENT DOCUMENTS

| JP | A-04-220822 | 8/1992 |
| JP | A-2000-156885 | 6/2000 |
| JP | A-2000-244392 | 9/2000 |
| JP | 2005-27189 | 1/2005 |

OTHER PUBLICATIONS http://www.artiza.co.jp/product/isite/index.html (Artiza Networks Inc., possible to access Mar. 26, 2007).
Japanese Office Action mailed May 24, 2011 for Japanese Patent Application No. 2007-088439.
Kenya Yonezawa et al., A Study on Autonomous Decentralized Radio Channel and Transmitting Power Control Method in Pico-cell System, IEICE Technical Report, RCS, Wireless Communication System, Japan, IEICE Oct. 2006, vol. 106, No. 305, pp. 85-89.

(Continued)

*Primary Examiner* — Dwayne Bost
*Assistant Examiner* — Yungsang Lau
(74) *Attorney, Agent, or Firm* — Morgan, Lewis & Bockius LLP (57) ABSTRACT

In order to improve the reduction of interference among cells such as pico cells and ease operations of arranging and controlling the cells, a wireless communication area measuring apparatus includes: a signal measuring unit for calculating wireless environment indicators at measuring points based on measured data of received signal strength indicators of a plurality of base stations; a transmission power determination unit for adjusting transmission power of the base stations based on margins of the received signal strength indicators; and a display unit for outputting adjustment results of the transmission power of the base stations.

6 Claims, 6 Drawing Sheets

OTHER PUBLICATIONS

Kosuke Yamazaki et al., Centralized Channel Allocation Algorithm with Graph Theory for Pico-cell System, Proceedings of the Society Conference of IEICE Communication 1, Japan, IEICE Mar. 8, 2006, p. 512.

Kosuke Yamazaki et al., A Performance Evaluation of Centralized Channel Allocation Algorithm with Graph Coloring Theory for Pico-cell System, IEICE Technical Report, RCS, Wireless Communication System, Japan, IEICE Oct. 2006, vol. 106, No. 305, pp. 79-83.

* cited by examiner

WIRELESS COMMUNICATION AREA MEASURING APPARATUS AND COMPUTER PROGRAM OF THE SAME

BACKGROUND OF THE INVENTION

1. Field of the Invention

The present invention relates to a wireless communication area measuring apparatus and a computer program for designing a wireless communication area.

Priority is claimed on Japanese Patent Application No. 2007-088439, filed Mar. 29, 2007, the content of which is incorporated herein by reference.

2. Description of the Related Art

In a conventional technique, of a cellular system, a wireless communication area is extended by spreading macro/micro cells. In the near future, due to using higher frequencies, it can be easily forecasted that there will be an increase of trials of providing pico cells by setting base stations with low power which can be easily installed and each of which covers a small area in order to eliminate areas at which wireless communication is not available, for example, skip zones or blind zones made by buildings and the inside of buildings. On the other hand, even today, wireless local area networks (wireless LAN) which provide pico cells are generally used for wireless communication systems inside buildings. In such a pico cell system, in general, pico cells having a radius of several decade meters are spread and set on a two-dimensional area. However, there is a problem in which cell size and shape fluctuate because of objects inside the wireless communication area (for example, shape and location of buildings in the case of an outdoor area, and regarding indoors, structure of rooms, equipment and furniture inside the building in the case of an indoor area), and consequently pico cells are irregularly arranged. Due to such a problem, in practical cases, it is difficult to apply the prior art for controlling base stations as described in Patent Document 1 below which has an assumption of regularly arranging pico cells. Hence, there is a requirement for a technique of dynamically controlling base stations that can be applied to irregularly arranged cells in order to reduce interference among cells such as pico cells. Regarding such a requirement, in a conventional wireless LAN, a technique is generally known that estimates the cell shapes by applying a computer simulation based on a layout of rooms in which access points (AP) are set, and that controls and determines the arrangement of APs, the arrangement of frequency channels assigned to APs and transmission power of APs.

[Patent Document 1] Japanese Patent Application, First Publication No. 2005-27189

[Non-Patent Document 1] http://www.artiza.co.jp/product/isite/index.html (Artiza Networks Inc., possible to access in Mar. 26, 2007)

It should be noted that, in the above-described prior art of controlling base stations, the cell shapes are estimated by using a computer simulation based on a layout of the rooms. However, such a technique for estimating the cell shapes based on the layout of the rooms has not been sufficiently developed, and there is a problem in which the base stations cannot be appropriately arranged and controlled.

In addition, in the above-described prior art, it is necessary to input the layout of the rooms in detail and to accurately input materials (dielectric constants) of objects inside the rooms. Therefore, inputting such data for a computer simulation was a heavy load for operators, it was not easy to obtain a simulation result, and it took a long time to obtain a result.

SUMMARY OF THE INVENTION

The present invention was conceived in order to solve such problems and has an objective to provide a wireless communication area measuring apparatus and a computer program for measuring a wireless communication area that improves the reduction of interference among cells such as pico cells and that eases operations of arranging and controlling the cells.

In order to solve the above-described problems, the present invention provides, for example, the following aspects.

A first aspect is a wireless communication area measuring apparatus including: a wireless environment indicator calculation unit for calculating wireless environment indicators at measuring points based on measured data of received signal strength indicators of a plurality of base stations; a transmission power control unit for adjusting transmission power of the base stations based on margins of the received signal strength indicators; and a data output unit for outputting adjustment results of the transmission power of the base stations.

A second aspect is the above-described wireless communication area measuring apparatus, wherein the transmission power control unit adjusts the transmission power of the base stations in a manner in which the margin of the wireless environment indicator is reduced if the margin of the wireless environment indicator is large.

A third aspect is the above-described wireless communication area measuring apparatus, further including: a frequency channel arrangement determination unit for determining the arrangement of frequency channels of the base stations based on the received signal strength indicators measured with regard to each of the base stations, wherein the wireless environment indicator calculation unit calculates the wireless environment indicators based on a precondition of the arrangement of the frequency channels, and the data output unit outputs the arrangement of the frequency channels.

A fourth aspect is the above-described wireless communication area measuring apparatus, wherein the data output unit outputs a graph which indicates the arrangement of the frequency channels.

A fifth aspect is the above-described wireless communication area measuring apparatus, wherein the graph includes: nodes corresponding to the base stations; and an edge which connects a pair of the nodes if there is an overlapped portion of cells corresponding to the pair of nodes.

A sixth aspect is the above-described wireless communication area measuring apparatus, wherein the graph indicates different frequency channels by assigning different shapes or colors to the nodes.

A seventh aspect is the above-described wireless communication area measuring apparatus, wherein the graph indicates the amount of transmission power of the nodes by using the size of the nodes.

An eighth aspect is the above-described wireless communication area measuring apparatus, wherein the data output unit, outputs the status of accessibility from the measuring points to each of the nodes.

A ninth aspect is the above-described wireless communication area measuring apparatus, further including a received signal strength measuring unit for measuring the received signal strength of each of the base stations.

A tenth aspect is a computer program stored on a computer readable medium including computer executable instructions for: providing a wireless environment indicator calculation function for calculating wireless environment indicators at measuring points based on measured data of received signal strength indicators of a plurality of base stations; providing a transmission power control function for adjusting transmission power of the base stations based on margins of the received signal strength indicators; and providing a data output function for outputting adjustment results of the transmission power of the base stations.

An eleventh aspect is the above-described computer program stored on a computer readable medium, further comprising computer executable instructions for: providing a received signal strength measuring function for measuring the received signal strength of each of the base stations.

Therefore, the above-described wireless communication area measuring apparatus can be realized by using a computer.

In accordance with above described aspects, it is possible to improve the reduction of interference among cells such as pico cells and ease operations of arranging and controlling the cells.

DETAILED DESCRIPTION OF THE INVENTION

Hereinafter, one embodiment is explained in reference to the drawings.

Figure 1:
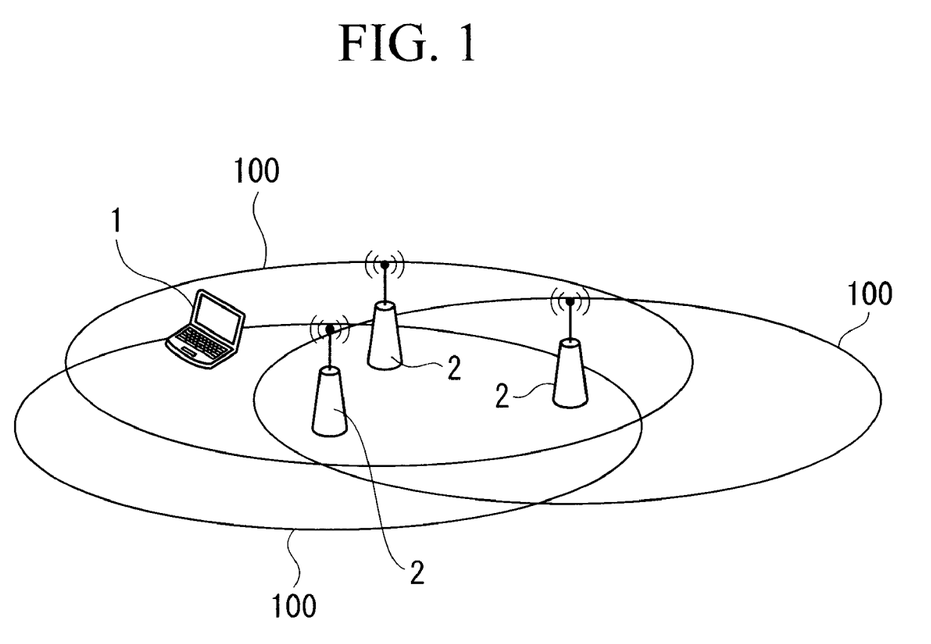
FIG. 1 is a drawing for describing a wireless communication area measuring apparatus of one embodiment.

FIG. 1 is a drawing for describing a wireless communication area measuring apparatus 1 of this embodiment. In FIG. 1, the wireless communication area measuring apparatus 1 is used in a wireless communication system. The wireless communication system shown in FIG. 1 includes base stations 2 and a mobile station 3 (not shown in FIG. 1). Each of the base stations 2 forms a cell 100 which is a wireless communication area. The mobile station 3 can communicate with the base station 2 having the cell 100 in which the mobile station 3 is included.

In an example shown in FIG. 1, three cells 100 are arranged while having overlapped areas. In such a case, there is a possibility of causing interference of frequency channels between two cells of the base stations 2, and it is preferable to prevent such interference. In order to prevent the interference, in this embodiment, an operator conducts a measuring operation at multiple measuring points inside the communication area by using the wireless communication area measuring apparatus 1. The wireless communication area measuring apparatus 1 adjusts arrangement of frequency channels assigned to the base stations 2 and transmission power of the base stations 2 based on the measured data at the measuring points, and outputs the adjustment results. The operator determines the arrangement of frequency channels assigned to the base stations 2 and transmission power of the base stations 2 based on the adjustment results outputted from the wireless communication area measuring apparatus 1.

Hereinafter, a constitution of the wireless communication area measuring apparatus 1 of this embodiment is explained in detail.

Figure 2:
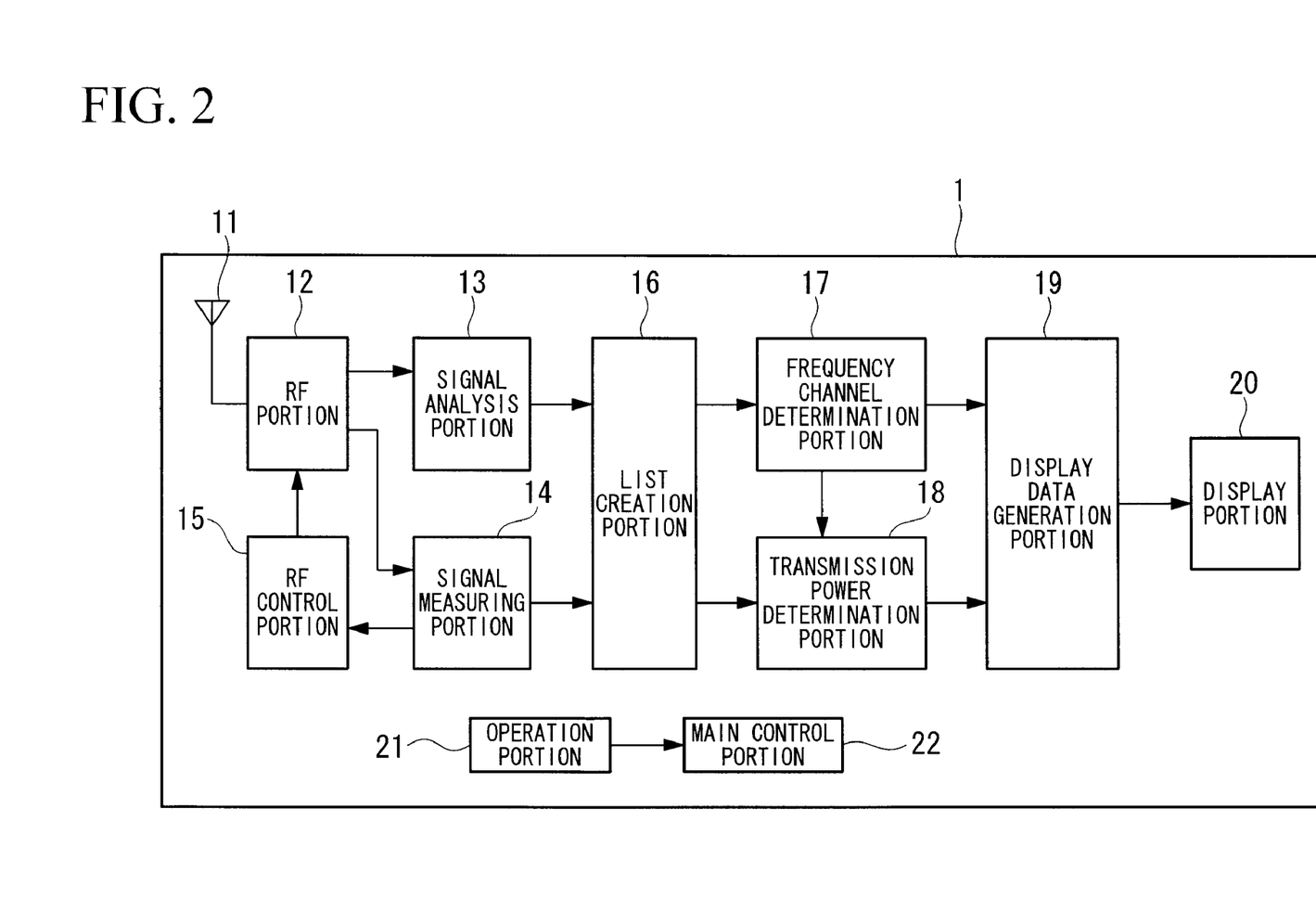
FIG. 2 is a block diagram for describing a constitution of the wireless communication area measuring apparatus of one embodiment.

FIG. 2 is a block diagram showing a constitution of the wireless communication area measuring apparatus 1 of this embodiment. In FIG. 2, an RF unit 12 converts a radio frequency (RF) of wireless signals received via an antenna 11 to an intermediate frequency (IF) or a baseband frequency. A signal analysis unit 13 analyzes control signals received by the RF unit 12, and outputs identification information (base station ID) of the base stations 2 which are accessible. Here, "accessible" means that it is possible to obtain base station information by demodulating and analyzing the control signals transmitted from the base station 2. A signal measuring unit 14 measures an RSSI (received signal strength indicator) of the control signal received via the RF unit 12. A RF control unit 15 controls the RF unit 12 in order to receive signals of all the frequency channels regarding all the measuring points.

A list creation unit 16 creates a list of accessible base stations which includes both the base station ID output from the signal analysis unit 13 and measured RSSI data obtained by the signal measuring unit 14. The list creation unit 16 creates the list of accessible base stations with regard to each of the measuring points. A frequency channel determination unit 17 determines a frequency channel to be assigned to each of the base stations 2 based on the accessible station list. Based on the measured RSSI data included in the list of accessible stations, a transmission power determination unit 18 determines transmission power of each of the base stations 2 in a precondition of the determined arrangement of frequency channels assigned to the base stations 2.

A display data generation unit 19 generates display data based on both frequency channel arrangement information output from the frequency channel determination unit 17 and transmission power information output from the transmission power determination unit 18. A display unit 20 constituted from a display device such as a CRT (Cathode Ray Tube) or a liquid crystal display apparatus displays the display data output from the display data generation unit 19.

An operation unit 21 is constituted from input devices such as a keyboard, a numeric keypad and a mouse, conducts a data input operation in accordance with operations of the operator. A main control unit 22 controls the overall operations of the wireless communication area measuring apparatus 1 based on the input data from the operation unit 21.

Figure 3:
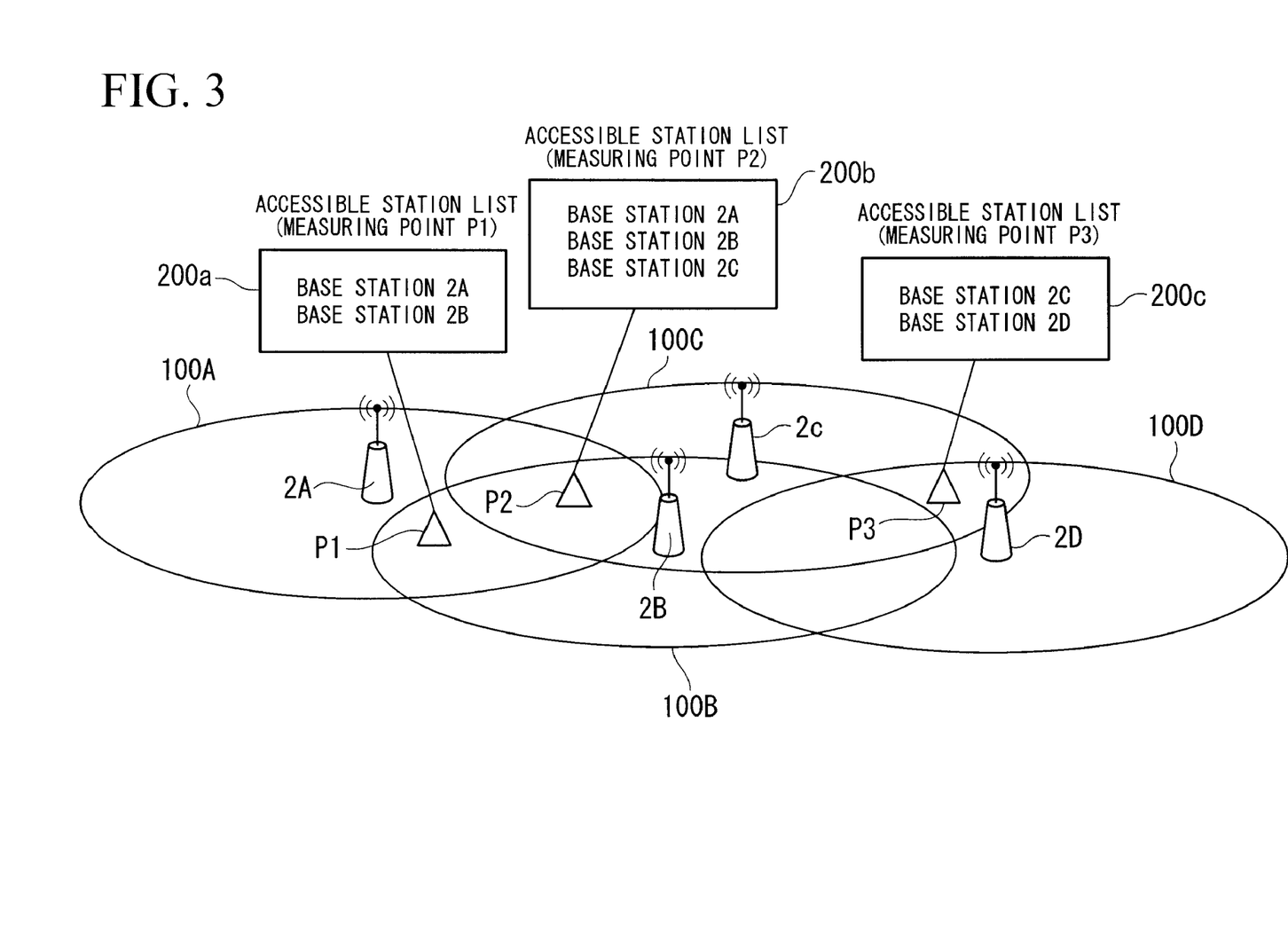
FIG. 3 is a drawing of an example an accessible station list of one embodiment.

In reference to FIG. 3, an operation of creating the accessible station list by the list creation unit 16 shown in FIG. 2 is explained.

The list creation unit 16 creates a list of accessible base stations with regard to each of the measuring points. The list creation unit 16 receives the base station ID of the accessible base stations 2 from the signal analysis unit 13, and receives the measured RSSI data with regard to each of the base stations 2 from the signal measuring unit 14. The list creation unit 16 inserts both the base station ID of the accessible base stations 2 and the measured RSSI data corresponding to the accessible base stations 2 into the list of accessible stations.

FIG. 3 shows an example of the list of accessible stations. It should be noted that the measured RSSI data of the base stations 2 is omitted in FIG. 3. An example of the wireless communication system shown in FIG. 3 includes four base stations 2A, 2B, 2C and 2D. The base stations 2A, 2B, 2C and 2D correspondingly form cells 100A, 100B, 100C and 100D. The cells 100A-100D are arranged so as to have overlapped portions. In detail, the cells 100A, 100B and 100C overlap. In addition, the cells 100B, 100C and 100D overlap. However, the cell 100A does not overlap the cell 100D. On the other hand, in the example shown in FIG. 3, the wireless communication area measuring apparatus 1 measures at three measuring points P1, P2 and P3. The measuring point P1 is included in an overlapped area of the cells 100A and 100B. The measuring point P2 is included in an overlapped area of the cells 100A, 100B and 100C. The measuring point P3 is included in an overlapped area of the cells 100C and 100D.

As shown in FIG. 3, the measuring point P1 is accessible to both the base stations 2A and 2B, and consequently, an accessible station list 200a is created which indicates the base stations 2A and 2B. The measuring point P2 is accessible to the base stations 2A, 2B and 2C, and consequently, an accessible station list 200b is created which indicates the base stations 2A, 2B and 2C. The measuring point P3 is accessible to the base stations 2C and 2D, and consequently, an accessible station list 200c is created which indicates the base stations 2C and 2D. The frequency channel determination unit 17 and the transmission power determination unit 18 receive the accessible station lists 200a, 200b and 200c.

Here, a frequency channel arrangement determination operation conducted by the frequency channel determination unit 17 shown in FIG. 2 is explained. The frequency channel arrangement determination operation of this embodiment includes the following three steps A-1, A-2 and A-3. The frequency channel determination unit 17 receives the accessible station lists of all the measuring points from the list creation unit 16.

(Step A-1: Graph Generation)

Figure 4:
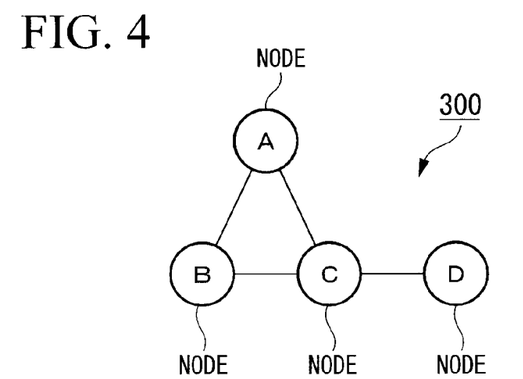
FIG. 4 is a drawing of an example graph of one embodiment.

The frequency channel determination unit 17 generates a graph in which the base stations 2 of the accessible station list are nodes (vertexes). The nodes that are accessible base stations 2 of the same measuring point are connected by edges. The frequency channel determination unit 17 generates graphs with regard to each of the measuring points based on the corresponding accessible station list, and calculates a summation of the generated graphs in order to obtain an integrated graph. FIG. 4 shows a graph 300 that is an example of the integrated graph. The graph 300 shown in FIG. 4 is generated based on the accessible station lists 200a, 200b and 200c shown in FIG. 3. In the graph 300, nodes A, B, C and D respectively correspond to the base stations 2A, 2B, 2C and 2D. In the graph, for example, the edge connecting two nodes indicates that two base stations corresponding to the nodes connected by the edge have an overlapped portion between the cells, that is, there is interference between two cells of the base stations 2.

The frequency channel determination unit 17 calculates a score for each of the edges included in the graph, and appends the score to the graph. The score is a value obtained by quantifying influence of interference among cells. Below, three examples of the score are given.

Example 1

The score of an edge is obtained by calculating the maximum absolute value of the difference in decibels (dB) of the measured RSSI data between two base stations 2 corresponding to two nodes which are connected by the edge.

Example 2

The score of an edge is obtained by calculating the number of measuring points at which two base stations 2 corresponding to two nodes connected by the edge are detected as accessible base stations (in other words, the number of accessible station lists in which the base stations 2 corresponding to nodes connected by the edge are included).

Example 3

The score of an edge is obtained by calculating sum of the inverse of CIR in linear scale which is derived from the difference of RSSI data from two base stations 2 corresponding to two nodes connected by the edge.

(Step A-2: Determining Whether or not it is Possible to Paint Colors)

The frequency channel determination unit 17 determines whether or not it is possible to paint colors on the nodes of the graph by using a predetermined number of colors (number of available frequency channels). In such a determination, it is possible to use a chromatic polynomial which is generally-known in graph theory.

(Step A-3: Modifying Shape of Graph)

If the frequency channel determination unit 17 detects that it is not possible to paint colors on the nodes of the graph in the above-described Step A-1, the frequency channel determination unit 17 cuts one of the edges of the graph. The edge which is cut has the minimum score among the edges. Here, the score indicates a quantified value of interference among the cells, and by cutting the edge, the same frequency channel can be assigned to an overlapped area that has comparatively small influence from interference (in other words, interference between such two cells is allowed). After cutting the edge, the frequency channel determination unit 17 conducts an operation of determining whether or not it is possible to paint colors in Step A-2 again.

The frequency channel determination unit 17 repeats operations of Steps A-2 and A-3 until the frequency channel determination unit 17 detects that the graph can be painted with the predetermined number of colors.

(Step A-4: Painting Colors (Assigning Frequency Channels))

If the frequency channel determination unit 17 detects that the graph can be painted with the predetermined number of colors, the frequency channel determination unit 17 assigns colors to the graph in a manner in which the neighboring nodes (nodes connected by the edge each other) are not in the same color. Each of the colors corresponds to one frequency channel. Therefore, the same frequency channel is assigned to the nodes (that is, the base stations 2) to which the same color is assigned. On the other hand, different frequency channels are assigned to the nodes (that is, the base stations 2) to which different colors are assigned. It should be noted that it is possible to apply a generally-known method of painting colors.

It should be noted that there may be a case in which an interference wave is detected from a base station that is not included in the wireless communication system and cannot be controlled. If a bandwidth of the frequency of the interference wave is smaller than the bandwidth of the available frequency of the wireless communication system, it is possible to assign a color to the uncontrollable base station first in the operation of assigning colors.

It should be noted that it is necessary to apply a method of assigning the frequency channels that arranges frequency channels so as to avoid or reduce interference of frequency channels among cells corresponding to the base stations 2. However, there are no other limitations to the method of assigning the frequency channels.

Here, a transmission power determination operation which is conducted by the transmission power determination unit 18 shown in FIG. 2 is explained. A transmission power determination operation of this embodiment includes the following three steps, B-1, B-2 and B-3. The transmission power determination unit 18 receives the accessible station list of each of the measuring points from the list creation unit 16. In addition, the transmission power determination unit 18 receives information of arrangement of the frequency channels from the frequency channel determination unit 17. Here, in order to simplify the explanation, it should be noted that an initial transmission power of the base stations 2 is the maximum.

(Step B-1: Picking Up Measuring Points)

The transmission power determination unit 18 calculates the CINR (Carrier to Interference and Noise power Ratio) of each of the measuring points based on the measured RSSI data included in the accessible station lists. The transmission power determination unit 18 calculates CINR which is the absolute value of the differences in dB of the measured RSSI data among base stations 2. Here, the noise power is a predetermined value. With regard to each of the base stations, the transmission power determination unit 18 selects one of the measuring points that has the minimum CINR.

(Step B-2: Changing Transmission Power)

The transmission power determination unit 18 selects the measuring point which has the maximum margin of CINR among the measuring points selected at the Step B-1. Here, the margin of CINR is a margin with regard to each of the measuring points compared to a predetermined value (CINRreq). In other words, the margin of CINR is obtained by calculating the difference between CINR of the measuring point and the predetermined value (CINRreq). Here, CINRreq is the minimum value of CINR that is necessary for the wireless communication system, or is the minimum value of CINR necessary for each of the measuring points (CINR can be fluctuated at each measuring point).

The transmission power determination unit 18 reduces the transmission power of the base station 2 corresponding to the selected CINR so as to set the margin of the CINR of the selected measuring point to 0.

(Step B-3: Updating CINR)

The transmission power determination unit 18 calculates the CINR and the margin of the CINR again with regard to each measuring point based on the reduced transmission power of the base stations 2 after operation of the Step B-2.

The transmission power determination unit 18 repeats the operations of the Steps B-2 and B-3 until the CINR of all measuring points are less than or equal to a predetermined value (CINRgoal). Here, CINRgoal is obtained by adding a small amount to CINRreq. In other words, CINRgoal has a small margin compared to CINRreq.

In accordance with the above-described operation, the transmission power of each of the base stations 2 is determined. It should be noted that, in the above explanation, in order to simplify the explanation, the initial transmission power of the base stations 2 is the maximum. However, this is not a limitation. Even if the transmission power has already been reduced when measuring the transmission power, and it is possible to measure the transmission power of each of the measuring points, the above-described operations can be conducted by calculating the RSSI of the maximum transmission power based on the measured RSSI.

In the above-described embodiment, the CINR is used as an indicator for indicating a wireless communication environment of the mobile station. However, this is not a limitation. It is possible to use, for example, the CIR (Carrier to Interference Ratio) as an indicator for indicating wireless communication environment (wireless environment indicator) other than the CINR.

Figure 5:
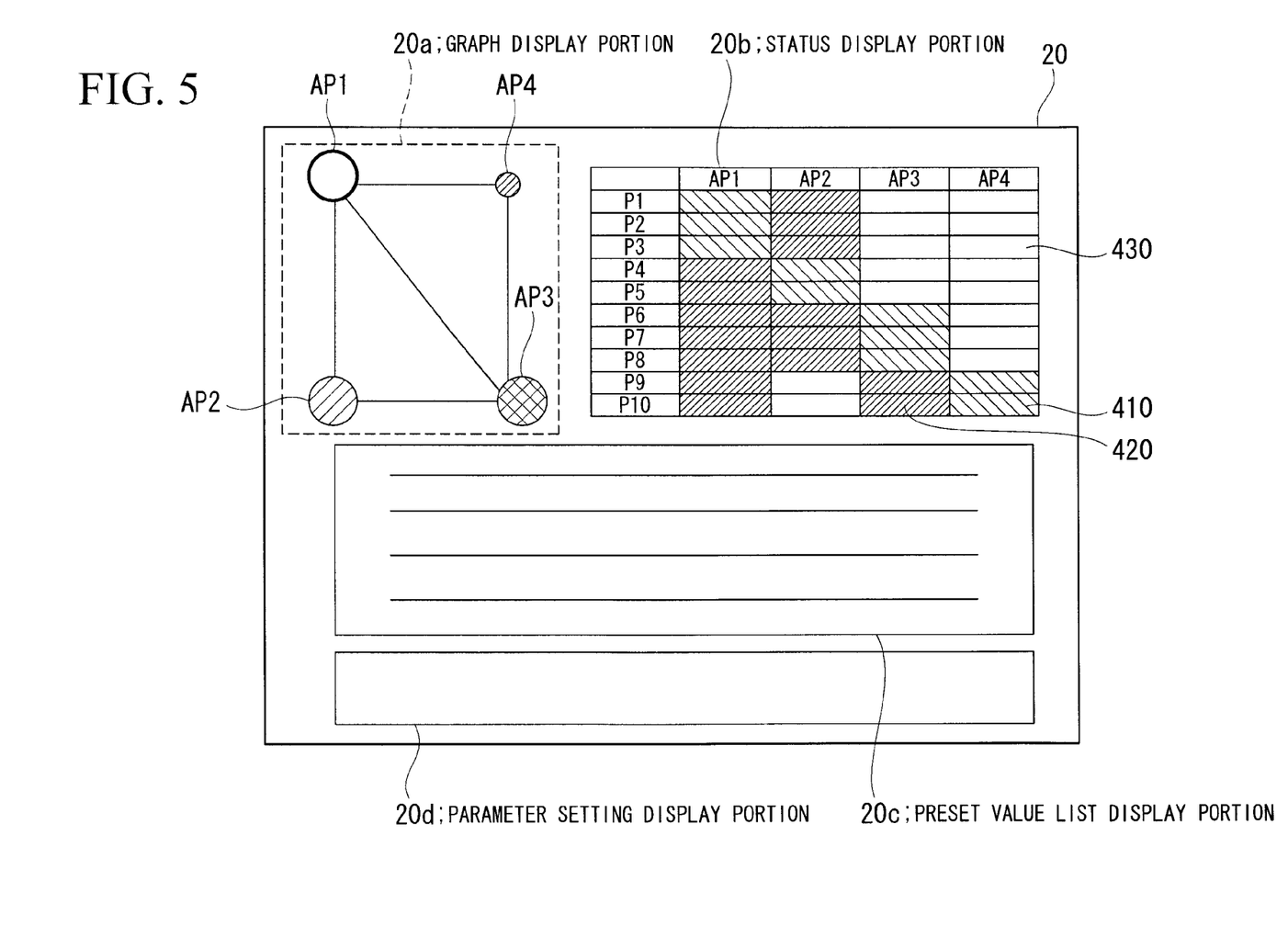
FIG. 5 is a drawing of an example display screen of one embodiment.

In reference to FIG. 5, a display data generation operation that is conducted by the display data generation unit 19 shown in FIG. 1 is explained.

The display data generation unit 19 receives both the data of a graph on which colors are painted and the data of frequency channels corresponding to the colors from the frequency channel determination unit 17. The data of a graph on which colors are painted and the data of frequency channels corresponding to the colors correspond to the frequency channel arrangement information. The display data generation unit 19 receives the data with regard to transmission power of each of the base stations 2 from the transmission power determination unit 18.

The display data generation unit 19 generates display data which is displayed on the display unit 20 based on the above-described received data. The display unit 20 inputs the display data and constitutes an image on a screen. FIG. 5 shows an example of the image on the screen. In FIG. 5, in the image of the screen, a graph display unit 20a, an access status display unit 20b, a preset value list display unit 20c and a parameter setting display unit 20d are provided.

The graph display unit 20a shows a graph on which color are painted, and shows transmission power of each of the nodes (base stations 2). FIG. 5 shows an example of a graph which is constituted from four nodes AP1, AP2, AP3 and AP4. Each of the nodes AP1-AP4 is painted with a color. The nodes AP2 and AP4 are painted with the same color, and consequently, it is easily and clearly understood that the same frequency channel is assigned to both the nodes AP2 and AP4. On the other hand, the nodes AP1 and AP3 are respectively painted with different colors. In addition, the node AP1/AP3 is painted with the different color from the nodes AP2 and AP4. Therefore, it is easily and clearly understood that the frequency channels different from both the nodes AP2 and AP4 are assigned to the nodes AP1 and AP3. It should be noted that it is possible to indicate different frequency channels by assigning different shapes to the nodes.

In addition, overlapped portions among cells, that is, the possibility of interference among cells, can be easily and clearly understood because of the edges of the graph.

The size of each of the nodes AP1, AP2, AP3 and AP4 indicates the amount of transmission power of the node. Consequently, it is possible for the operator to easily and clearly understand the amount of transmission power of each of the nodes AP1-AP4.

The access status display unit 20b shows the status of accessibility from each of the measuring points to the base stations 2. In an example of FIG. 5, with regard to 10 measuring points P1-P10, the status of accessibility to the nodes (base stations 2) AP1, AP2, AP3 and AP4 are shown clearly in each combination. Such a status of accessibility is determined by comparing the transmission power of the base station 2 to a predetermined threshold. In FIG. 5, for example, an indication 410 showing the status of accessibility indicates that it is possible to access to the corresponding base station 2 with the maximum transmission power and the status of accessibility is excellent. An indication 420 indicates that it is possible to access to the corresponding base station 2, but the status of accessibility is not the most preferable. An indication 430 indicates an inappropriate status of accessibility to the corresponding base station 2. In order to clearly indicate the status of accessibility, for example, there are displaying methods such as displaying with different colors, displaying with different patterns and displaying text data. Otherwise, it is possible to display the actual measured RSSI data.

The preset value list display unit 20*c* shows both the frequency channel assigned to each of the base stations 2 and transmission power of each of the base stations 2 in text format.

The parameter setting display unit 20*d* shows parameters (for example, number of available frequency channels) set to the wireless communication area measuring apparatus 1. The main control unit 22 shown in FIG. 2 notifies the display data generation unit 19 of the parameters which have been set to the wireless communication area measuring apparatus 1.

As described above, in this embodiment, a frequency channel is assigned to each of the base stations based on the RSSI of each of the base stations that are measured at each of the measuring points, the CINR of each of the measuring points is calculated based on a precondition of arrangement of assigned frequency channels, the transmission power of the base station is adjusted based on the margin of the CINR, and arrangement of assigned frequency channels of the base stations and adjusted results of the transmission power of the base stations are outputted. Therefore, it is possible to achieve easy arrangement of the frequency channels to the base stations and easy control of the transmission power of the base stations based on the measured RSSI data at a place inside the wireless communication area.

In accordance with the above-described embodiment, it is possible to improve the reduction of interference among cells such as pico cells, and consequently, it is possible to obtain the advantage of helping to constitute the most appropriate wireless communication area. In addition, it is possible to ease designing operations before constituting the wireless communication area, and consequently, it is possible to help reduce labor for constituting the wireless communication area.

Otherwise, in accordance with the above-described embodiment, it is possible to maintain communication quality of the wireless communication area because the transmission power of the base stations is adjusted based on the margin of the CINR. Consequently, as a result, it is possible to have an advantage in reducing the consumption of power at the base station.

Furthermore, in accordance with the above-described embodiment, the transmission power of the base station is adjusted so as to reduce the CINR within an allowable range if the margin of the CINR is large, it is possible to reduce interference of the cells corresponding to the neighboring base stations. Therefore, it is possible to obtain an advantage in increasing the CINR of a point at which CINR has been low. Hence, the most appropriate arrangement of the wireless communication area can be expected.

It should be noted that it is possible to constitute the wireless communication area measuring apparatus 1 of the above-described embodiment from special purpose devices. Otherwise, it is possible to constitute the wireless communication area measuring apparatus 1 of the above-described embodiment from a computer system such as a generally used personal computer, and it is possible to realize each function of the wireless communication area measuring apparatus 1 shown in FIG. 1 by executing a computer program corresponding to the function.

Moreover, it is also possible that a computer program for achieving the functions of the wireless communication area measuring apparatus 1 shown in FIG. 1 to be stored in a computer-readable medium where, a computer system reads the computer program stored on the medium, and an operation of measuring the wireless communication area is conducted by executing the computer program. It should be noted that, here the "computer system" includes an OS, hardware including peripheral devices, and the like.

In addition, the "computer-readable medium" is a mobile medium such as a flexible disc, a magneto-optical disc, a ROM, a flash memory and a DVD (Digital Versatile Disk), and a storage device such as a hard disc installed in a computer system.

Furthermore, the "computer-readable medium" includes a storage device or a memory that temporally stores a computer program, such as volatile memory (for example, DRAM (Dynamic Random Access Memory)) installed in a computer system which can be a server or a client that is used when the computer program is transmitted via a network such as the Internet or via a communication line such as a telephone line.

In addition, it is possible to transmit the above-described computer program from a computer system which stores the computer program in a storage device or the like, to another computer system via a transmission medium or via transmission waves included in the transmission medium.

Here, the "transmission medium" is a medium which has a function of transmitting information, for example, a network (communication network) such as the Internet or a communication network (communication line) such as a telephone line.

Moreover, it is possible that the above-described computer program is constituted so as to accomplish some of the above described functions.

Furthermore, it is possible that the above-described computer program be provided so as to realize the above-described functions by being linked with another computer program which is already stored in the computer system, that is, it is possible that the above-described computer program be a differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Figure 6:
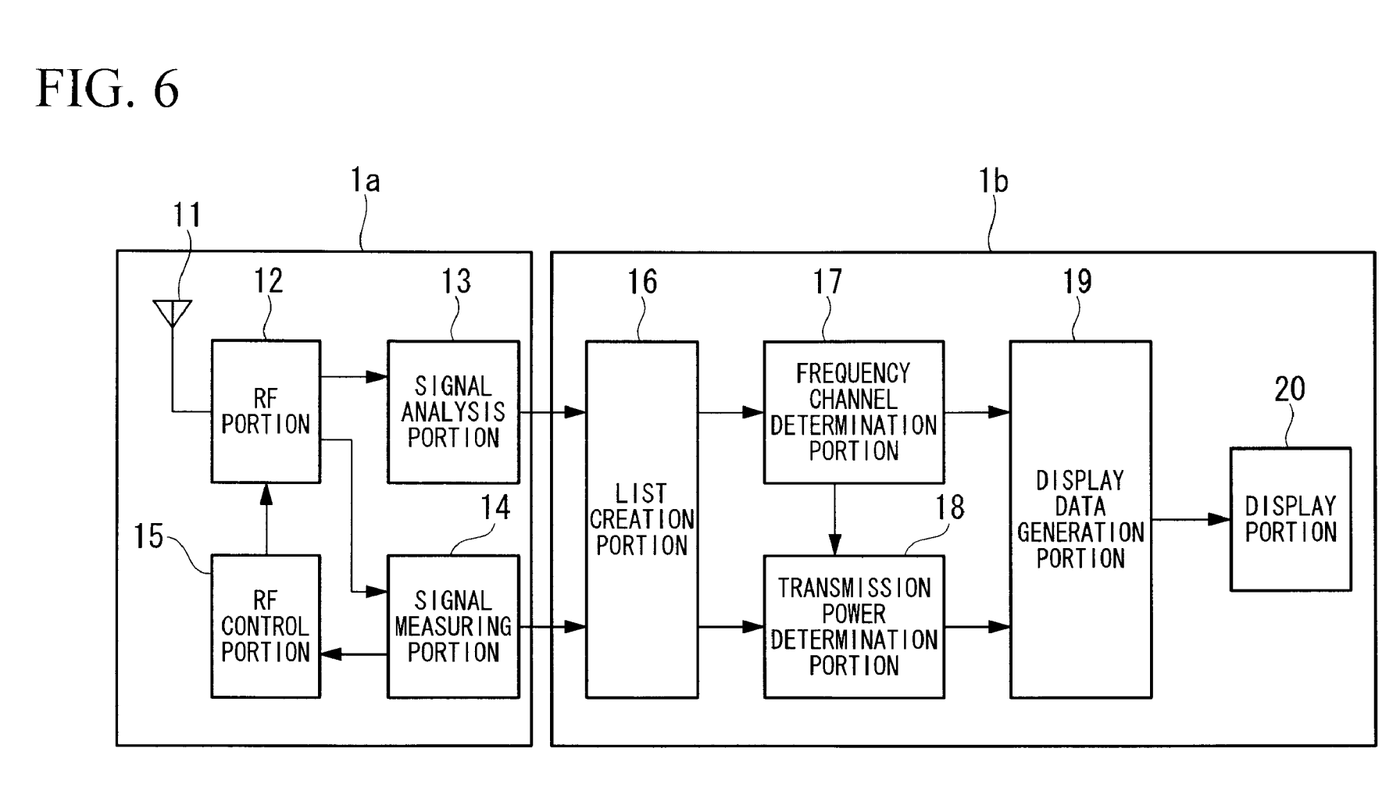
FIG. 6 is a block diagram showing a constitution of a wireless communication area measuring apparatus (measuring unit and data operation unit) of one embodiment.

For example, as shown in FIG. 6, it is possible to divide the wireless communication area measuring apparatus 1 of FIG. 1 into two apparatuses of a measuring unit 1*a* and a data operating unit 1*b*. In such a constitution, it should be noted that the operation unit and the main control unit are provided by both the measuring unit 1*a* and the data operating unit 1*b* (not shown in FIG. 6). Data between the measuring unit 1*a* and the data operating unit 1*b* can be transmitted and received via a communication line provided between them. Otherwise, it is possible to transmit and received data via a storage medium. Therefore, it is possible to realize small apparatuses which the operator carries when conducting a measuring operation, and it is possible to reduce the labor of the operator.

The wireless communication area measuring apparatus 1 can output data not only by displaying the data. For example, the wireless communication area measuring apparatus 1 can print the data, or write the data into a storage medium.

It is possible to calculate only the transmission power while the frequency channels are fixed. In such a case, it is possible to achieve easy control of the transmission power of the base stations based on the measured RSSI data obtained at the actual measuring points. On the other hand, it is possible to conduct only an operation of assigning the frequency channels to the base stations.

It should be noted that the present invention can be applied to wireless communication systems using various types of cells, and the pico cell is one example.

What is claimed is:

1. A wireless communication area measuring apparatus comprising:
    a wireless environment indicator calculation unit for calculating wireless environment indicators at measuring points based on measured data of received signal strength indicators of a plurality of base stations;
    a transmission power control unit for adjusting transmission power of the base stations based on margins of the received signal strength indicators;
    a frequency channel arrangement determination unit for determining an arrangement of frequency channels of the base stations based on the received signal strength indicators measured with regard to each of the base stations, wherein
    the wireless environment indicator calculation unit calculates the wireless environment indicators based on a precondition of the arrangement of the frequency channels, and
    a data output unit for outputting adjustment results of the transmission power, the arrangement of the frequency channels and a graph which indicates the arrangement of the frequency channels,
    wherein the graph comprises:
        nodes corresponding to the base stations and an edge which connects a pair of the nodes if there is an overlapped portion of cells corresponding to the pair of nodes.

2. A wireless communication area measuring apparatus according to claim 1, wherein
    the transmission power control unit adjusts the transmission power of the base stations in a manner in which the margin of the wireless environment indicator is reduced if the margin of the wireless environment indicator is large.

3. A wireless communication area measuring apparatus according to claim 1, wherein the graph indicates different frequency channels by assigning different shapes or colors to the nodes.

4. A wireless communication area measuring apparatus according to claim 1, wherein the graph indicates amount of transmission power of the nodes by using size of the nodes.

5. A wireless communication area measuring apparatus according to claim 1 or 2, wherein
    the data output unit, outputs a status of accessibility from the measuring points to each of the base stations.

6. A wireless communication area measuring apparatus according to claim 1, further comprising a received signal strength measuring unit for measuring received signal strength of each of the base stations.

* * * * *